Sept. 30, 1947.   G. E. BOCKRATH   2,428,194
AIRCRAFT CONTROL
Filed June 8, 1942    4 Sheets-Sheet 1

Inventor
GEORGE E. BOCKRATH.

Sept. 30, 1947.  G. E. BOCKRATH  2,428,194
AIRCRAFT CONTROL
Filed June 8, 1942  4 Sheets-Sheet 4

Inventor
GEORGE E. BOCKRATH.
by Charles Shiel
Attys.

Patented Sept. 30, 1947

2,428,194

UNITED STATES PATENT OFFICE 2,428,194

AIRCRAFT CONTROL

George E. Bockrath, Long Beach, Calif.

Application June 8, 1942, Serial No. 446,214

22 Claims. (Cl. 244—75)

This invention relates to aircraft and is directed more particularly to improved control surfaces therefor.

It is an important object of the invention to provide a novel control mechanism which embodies an improved mechanism for obtaining automatic trim or pitch control of an aircraft to which it is attached, thereby greatly increasing the controllability of the craft and greatly reducing the dangers accompanying uncontrolled stalling or diving particularly when it is desired to maintain low speeds such as the reduced speed desirable for landing and the like.

While the construction embodying the invention is shown herein as incorporated in an aircraft of the "tailless" type, it is contemplated that the various principles of the invention may be incorporated in aircraft of the conventional type. Furthermore, while the invention is disclosed herein as embodied in a plane of the pusher type, it is to be understood that the principles thereof may likewise be incorporated in a plane of the tractor type.

Another important object of the invention is to provide an aircraft with improved automatic trimming mechanism which includes a principal aerodynamic surface for pitch control, this surface preferably being disposed forwardly of the center of gravity of the aircraft.

Still another important object of the invention is to provide a surface which corresponds to the elevator of the character heretofore known which is so constructed and arranged that full movement thereof, and thus full control, thereby is available throughout all speeds in the flying range of the craft and throughout the full range of automatic trimming movement of the aerodynamic surfaces utilized for this purpose.

Still another object of the invention is to provide an automatic trimming mechanism for aircraft which is so constructed and arranged that diving moments of the craft, which increase as the speed decreases, are overcome by increasing the lift capacity of the control surface while also increasing the lift capacity of the supporting airfoil, thereby increasing the lifting capacity of all elements in the craft contributing to lift. Since in conventional aircraft diving moments are overcome by decreasing the lifting capacity of the horizontal tail surfaces, it is clear that the lifting capacity of conventional aircraft at low speeds is inferior to the lifting capacity of an aircraft constructed as herein described.

Another important object of the invention is to provide an aerodynamic control surface which is spring loaded and is so constructed and arranged as to automatically control for pitch in response to variations in the dynamic pressure of the air air impressed upon the control surfaces, these surfaces automatically assuming an increased angle of attack upon proportional decreases in the dynamic pressure of the air to maintain the craft in trim without requiring the special attention of the pilot.

It is a more specific object of the invention to provide a pitch control surface disposed forwardly of the center of gravity of the aircraft, this surface having a connection with high lift flaps whereby it moves simultaneously therewith to control the pitch developed by said flaps. The connection has incorporated therein a spring for automatically moving the control surface and the high lift flaps through the simultaneous movement to control pitching, there being additionally incorporated in the connection a dashpot for reducing the speed of oscillation of the surfaces through their automatic spring loaded movement.

It has been found that aircraft provided with mechanism affording the above advantages have much greater controllability and are thus much easier to fly; may be landed at much slower speeds and therefore are safer and require a minimum of landing space; are trimmed correctly for each speed by movement of the pitch control surface automatically to the correct position; and are automatically controlled to correct for the pitching produced by the flaps by automatic, simultaneous movement of the pitch control surface.

In accordance with the general features of the invention, there is provided herein a pitch control surface disposed forward of the center of gravity of the airplane and movable automatically and simultaneously with high lift flaps, the control surface having its aft portion manually deflectable by the pilot to correspond to the elevator surface of the conventional type of plane. The elevator surface and the pitch control surface of the plane are so constructed and arranged that the elevator is moved in the opposite direction to that of the usual aircraft construction to produce the same pitching moment, this being brought about by a novel spring differential assembly which differentially connects the pitch control assembly with the elevator assembly. The forward portion of the control surface is preferably hinged at the aerodynamic center of the entire pitch control surface which includes the surface of the elevator itself.

The pitch control surface is controlled by linkage secured thereto, the linkage being connected to a dashpot whereby movement of the pitch control surface with the elevator to trim the airplane is damped by said dashpot. The link, in addition to being controlled by the above mentioned dashpot, is also spring urged so that the control surface is automatically moved to trim the airplane at all speeds, for example, from landing speed to cruising speed, the high lift surfaces also being deflectably mounted on the plane and connected with the control surface whereby it also moves, simultaneously with the control surface, to aid in the trimming function. The high lift members and the control surface are simultaneously moved by changes in the moments about their hinge points due to changes in the dynamic pressure of the air resulting from changes in the speed of the airplane. This movement of the control surface, and the high lift devices, for trimming the airplane is in accordance with the relationship $M = C_m Q A C$, where $C_m$ is the coefficient of pitching (constant, as explained below) arbitrarily determined by the selection of airfoils and the general design of the plane, $Q$ is the dynamic pressure represented as $\frac{1}{2} p v^2$ in which $p$ is the density of the air, $A$ is the area of the airfoil in question, and $C$ is the average chord of the airfoil in question. In the above construction the elevator may at all times move throughout its full range of deflection independently of the particular deflection of the control surface to which it is hinged.

Many other objects and advantages of the invention will become apparent from the following description and accompanying drawings, in which:

Figure 6 is a detail view of compensating mechanism available to adjust the control surface for changes in the center of gravity of the airplane due to fuel consumption and the like;

It is understood that the embodiments shown herein are for illustrative purposes only and may be changed or varied without departing from the scope of the invention as set forth in the appended claims.

Figure 1:
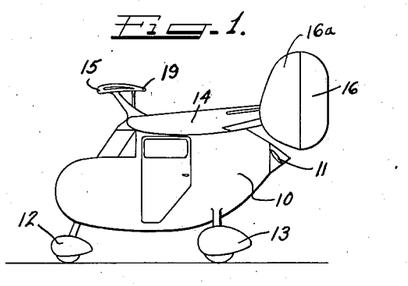
Figure 1 is a side elevational view of an airplane embodying the invention.
Figure 2:
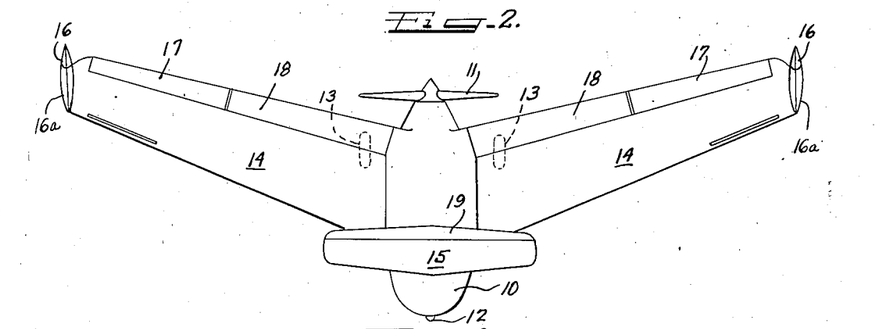
Figure 2 is a top plan view of such a plane.

Referring to the drawings, particularly to Figures 1 and 2, a suitable type of aircraft which may embody my invention includes a tailless construction of the pusher type including a cabin 10 having a rearwardly disposed propeller 11 motivated by a suitable power plant housed within the rear portion of the cabin. A tricycle landing gear including a single forward wheel assembly 12 and laterally disposed rear wheel assembly 13 affords stability for landing.

The aerodynamic surfaces of the craft comprise generally the main supporting surfaces which include the laterally disposed wings 14 and the upwardly and forwardly disposed control surface 15 both of which will be described more fully presently. The rudders 16 are suitably, operatively secured to fins 16a at the end of each wing 14, each wing also including a manually operable aileron 17 constituting the aft edge thereof in the vicinity of the respective rudders and high lift flaps 18 which are automatically responsive to dynamic pressure of the air as will be more fully explained presently. The ailerons 17 are of course available for rolling the aircraft as is well understood by those skilled in the art. The control surface 15 which in the present embodiment is disposed above and forward of the center of gravity of the aircraft is provided with a surface 19 corresponding to the elevator of conventional craft.

Generally speaking, the control surfaces and associated mechanisms now to be described are constructed and arranged to vary in lift or attitude automatically in accordance with variations in the dynamic pressures of the air imposed upon the lift surfaces without, however, any accompanying substantial change in the attitude of the aircraft itself.

Referring to the drawings, particularly to Figures 3, 4, 4a, 4b and 5, the pitch control surface 15 is shown supported upon the main lift surface 14 by struts 20 and 21, the lower end of each strut being securely attached to the forward end of the airfoil 14 in any conventional manner. The upper end of strut 20 is joined with the substantially central portion of the strut 21 by means of a brace member 22, the upper end of the strut 21 affording a hinge connection for the pitch control surface 15. This last named hinge connection may be provided by an eye construction at the upper end of the strut 21 and an apertured lug 23 depending from the lower surface of the pitch control member 15, said lug being apertured and adapted to receive, with the upper end of the strut 21, a pin 24. It is to be particularly noted that the position of the hinge connection, as determined by the disposal of the depending lug 23, is at the aerodynamic center of the entire control surface represented by the airfoil 15 and the airfoil 19.

With regard to the location of the hinged connection or fulcrum of the control surface at substantially the aerodynamic center thereof, it is found that since the pitching moment coefficients of the surface about this point are constant, the moments developed are proportional to the dynamic pressure of the air impressed thereupon. Hence, any change in the angle of attack of the control surface resulting in a change in lift afforded thereby does not result in a change in pitching about the aerodynamic center of the surface. Thus it follows that the automatic variations of the angle of attack of the control surface about the pin 24 is a function of the pitching moment developed about the aerodynamic center due to dynamic pressure of air rather than of the load carried or the lift thereof. In this manner, it will be seen that the automatic change in the angle of attack of the control surface is brought about entirely independent of the load involved or the lift it exerts, the automatic movement being entirely dependent upon the dynamic pressure of the air.

The lower aft surface of the airfoil 14 is provided with depending, rearwardly extending supporting arms 25 which are apertured at their ends to provide for a hinge connection with supporting arms 26 which depend from the lower forward surface of the high lift flap 18, the lower ends of each of the arms being connected by pivot pins 27. To increase the aerodynamic efficiency of the entire main supporting surface, the airfoil 14 is preferably rearwardly arcuately recessed to receive the forward edge of the respective high lift flap 18, the latter being provided at its forward edge with a lug 28 adapted to receive a connecting control link.

Figures 4C, 5:
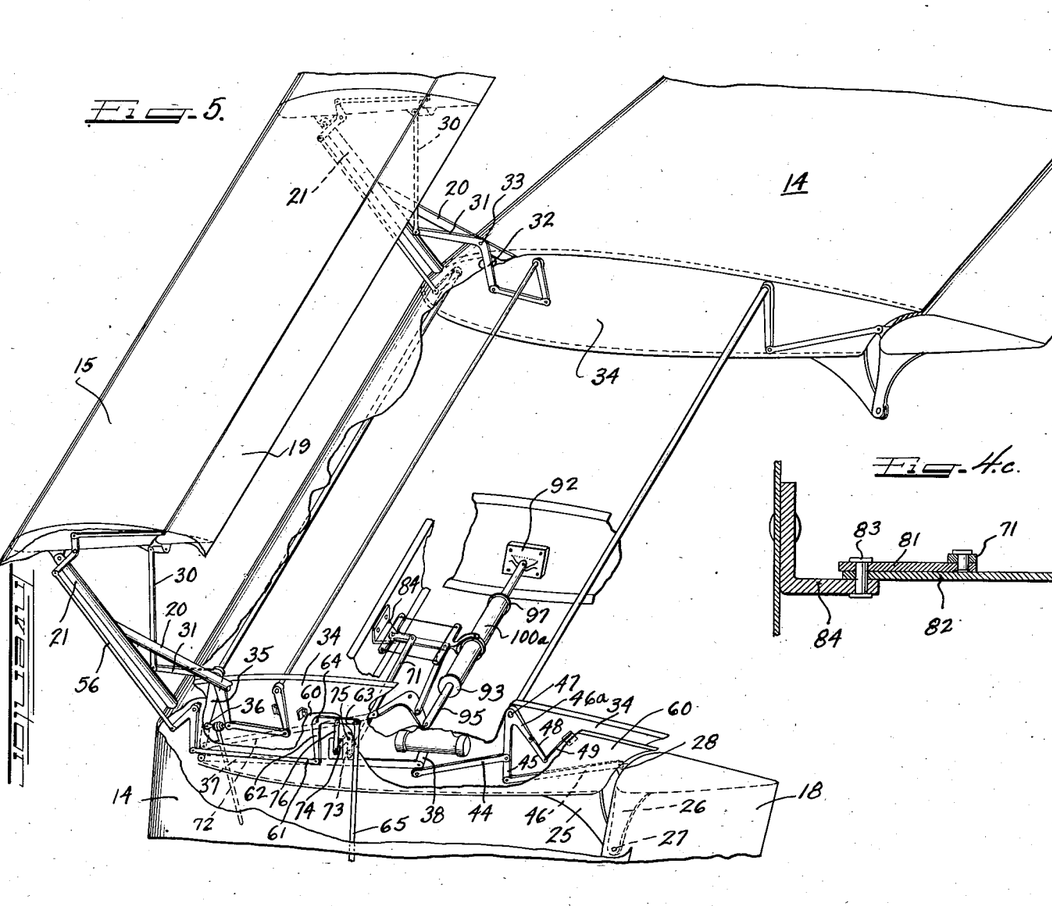
Figure 4c is a fragmentary cross-sectional view of a portion of the mechanism shown in Figure 4.
Figure 5 is a fragmentary perspective view of the aerodynamic surfaces and control connections shown in Figure 3.

As previously stated, the pitch control surface 15 and the high lift flaps 18 are, in accordance with the invention, connected together in such a manner that they deflect with simultaneous movement, and this movement is adapted to compensate automatically for variations in the dynamic forces impressed upon the respective surfaces. To this end, the surfaces 15 are provided with arms 29 aft thereof each arm being pivotally connected to a respective push-pull link 30. The links 30 are pivotally conected to respective arms 31 which have companion arms 32, the bell crank being thus formed having a pivotal connection 33 on the respective strut 20. Rocking movement of the bell crank arm 32, shown at the left of Figure 5, is transmitted to an arm 35 through a rigid connection 36 to be described more fully presently. The arm 35 is pivotally secured at its lower end to a push-pull member 37, the remote end of the member 37 having a pivotal connection with an arm 38 of a dashpot construction of conventional design.

To establish prescribed limits through which the airfoils 15 and 18 may move, the bell crank arm 32 has its lower end pivoted to a push-pull rod 32a which is in turn pivoted to an arm 32b pivoted as at 32c to the web 34. Suitable stops 32d are affixed to the web 34 to delimit the degree of movement of arm 32b and its associated links.

In the present disclosure, the arm 38 of the dashpot is connected to a rocking member 39 disposed within the casing 40 thereof. The casing 40 is provided with a double ended slide valve chamber 41 in which a double ended valve 42 reciprocates in response to the rocking motion of the arm 39. Each head of the valve is provided with a restricted escape aperture 43. It will be understood that when the chamber 41 is completely filled with oil, movement of the valve heads 42, the arm 39 and the arm 38 and thus the previously described bell crank and push-pull linkages, will be damped since the movement thereof will be reduced to relatively slow back and forth movement as distinguished from relatively rapid fluttering motion. Consequently, it will be understood that fluttering of the airfoils connected to the linkages whose movements are under the influence of the dashpot valve will be reduced to a minimum.

Similarly connected to the arm 38 of the dashpot mechanism above described is a push-pull rod 44 having a suitable pivotal connection with a bell crank arm 45, the lower end of which is secured to a push-pull rod 46. The remote end of the rod 46 is pivotally connected to the forwardly extending lug 28 of the respective high lift flap 18. A companion bell crank arm to the arm 45 is shown at 46a and the bell crank thus formed is suitably pivoted as at 47 to the web 34 of the airfoil 14. The bell crank arm 46a is pivotally connected through an arm 48 to a cantilever spring 49 similarly mounted on the web 34.

From the foregoing it will be seen that a change in attitude of airfoils 15 and 18 will occur simultaneously due to the linkages above described and that the movement thereof will be controlled through relatively slow oscillations by means of the interposed dashpot 40. Furthermore, it will be seen that because of the cantilever spring 49 and its associated linkages, an increased resistance to a decrease in flap and control surface deflection relative to the airfoil 14 occurs as the surface 15 and flaps 18 approach a position of zero deflection.

The following table shows the relative dynamic pressure, hinge moment coefficient ($C_H$), flap hinge moment and angle of deflection of the flaps worked out for given speeds of an aircraft having given airfoils constructed and arranged in accordance with the invention:

| Speed | Q | Flap Angle | $C_H$ | Flap Hinge Moment |
|---|---|---|---|---|
|  |  | Degrees |  |  |
| 50 | 6.25 | 30 | .15 | 281 |
| 60 | 9.22 | 20+ | .08 | 221 |
| 80 | 16.4 | 8.6 | .0255 | 125.5 |
| 100 | 25.6 | 3.4 | .009 | 68.3 |
| 120 | 36.9 | .5 | .002 | 21.1 |
| 125 | 40.0 | 0 | 0 | 0 |

For purposes of the present explanation it is to be understood that additional mechanisms, to be described fully presently, are associated with the above described linkages whereby the connected airfoils will automatically assume attitudes of various degrees in accordance with the speed of the airplane or the dynamic pressure upon the respective airfoils. It is this concept, as will be understood presently, which contributes to the automatic trimming of the airplane and to the automatic control of the pitching moments which result from the trimming action.

From the foregoing table it will be seen that the hinge moment increases as the angle of flap deflection increases in accordance with decreasing speed of the airplane.

From the table it will be seen that the above change in values is accompanied by a decrease in dynamic pressure of the air. Due to the increase in the hinge moment $C_H$ as the flap is deflected, the foregoing change in values accompanies a reduction in the speed of the plane and a reduction in dynamic pressure. In view of the development of the moment values shown in the above table, it is desirable to have the load on the cantilever spring 49 high while the flap is at zero deflection and to have the load decrease as the angle of deflection is increased. Thus the load impressed upon the flap linkages by the cantilever spring 49 is inversely proportional to the moments developed by the flap. It will be understood that the above arrangement balances the flap hinge moment for all flap positions since the various positions are proportionally influenced by the dynamic pressure.

It is to be understood that the cantilever spring 49 is a control element rather than a motivating element, the motivation of the control surfaces through their automatic changes in attitude being brought about by other mechanism associated with the above described linkages.

Broadly speaking, the airfoils 15 and 18 impart to the aerodynamic system disclosed herein a trim or pitch control and a lift increasing means which is automatic depending upon the dynamic pressures involved. Such control, however, does not disturb the usual manual control required, so the pilot may govern the action of the plane according to immediate conditions arising during flight to obtain voluntary change of direction, landing, takeoff, climbing, diving or the like.

So far as the latter maneuvers are concerned, the flaps 17 of the airfoils 14 may be manipulated by the pilot at his will to afford rolling, the rudders 16 may be likewise manipulated to obtain a change in direction, and the airfoil 19 may be manipulated in the place of a conventional elevator.

To the end that the control elevator 19 may be manipulated manually and independently of the pitch control surface 15 upon which it is mounted by means of a depending lug 50 having a pivotal connection with the rear end of supporting arm 29, there is provided a push-pull rod 51 which has its rear end pivotally connected to the forward edge of the surface 19 and its forward end pivotally secured to a bell crank arm 52 having a companion arm 53, these arms forming a bell crank which is pivotally mounted as at 54 to a lug 55 which depends from the lower surface of the airfoil 15. The end of the bell crank arm 53 remote from the pivot 54 is suitably pivotally secured to a push-pull rod 56 which extends downwardly in substantial parallel relationship to the strut 21 and has its lower end pivotally secured to a bell crank arm 57 having a companion arm 58, the bell crank thus formed being pivoted as at 59 to the web 60 in the respective airfoil 14.

The bell crank arm 58 has its lower end pivotally secured to a push-pull rod 61 which is in turn pivotally connected to a bell crank arm 62 having a companion arm 63, the bell crank thus formed being pivoted as at 64 to the web 60 of the airfoil 14. The remote end of the bell crank arm 63 is pivotally secured to a push-pull rod 65 which extends downwardly from the airfoil 14 into the vicinity of the cabin 10 and has its lower end pivotally secured to a bell crank arm 66 which with the arm 67 forms a bell crank which is suitably pivotally secured to the cabin as at 68. The arm 67 is connected to a control stick 69 which is available to the pilot through a push-pull rod 70. Thus it will be seen that fore and aft motion imparted to the control stick 69 by the pilot will result in deflection of the elevator surface 19 to impart flying control to the aircraft.

Figure 6:
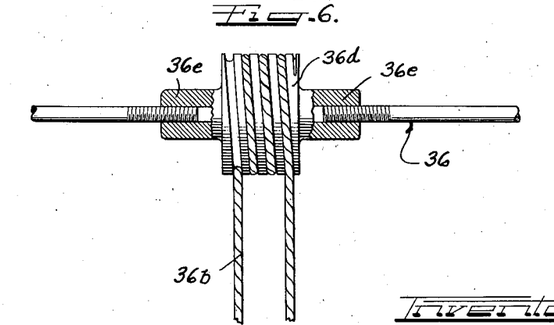

There is also disposed in the cabin, in a position available to the pilot, a trim crank 36a having a suitable pulley fixedly secured thereto and about which a flexible motion transmitting member 36b extends. The member 36b extends around two pulleys 36c also suitably disposed in the cabin and thence extends upwardly to wind around a spirally grooved turnbuckle member 36d (see Figure 6) which is provided with oppositely disposed, inwardly and oppositely threaded bosses 36e. The rigid member 36, pivotally secured at each end to the bell crank arm 32 and the arm 35 respectively, comprises two oppositely threaded rods which extend into the respective bosses 36e thereby to be spread apart or drawn together in accordance with the direction of rotation of the member 36d. From the foregoing it will be seen that the length of the rigid member 36 may be increased or decreased in accordance with the operation of the trim crank 36a by the pilot. Thus the angle between the bell crank arm 32 and the arm 35 may be varied, this resulting in a change of the relative deflected positions between the airfoil 15 and the airfoils 18. As will appear more clearly presently, this adjustment is made by the pilot to accommodate variations in the position of the center of gravity of the airplane resulting from consumption of fuel and other well known factors.

As previously explained, movements of the control surface 15, the high lift surface 18 and the elevator surface 19 in addition to being controlled by the dashpot 40 are also spring controlled. This spring control is such that the various members of the actuating system are spring loaded to automatically function in accordance with the degree of dynamic pressure of the air upon the respective surfaces and in accordance with normal manipulation imparted to the elevator surface 19.

Figures 3, 4, 4A, 4B:
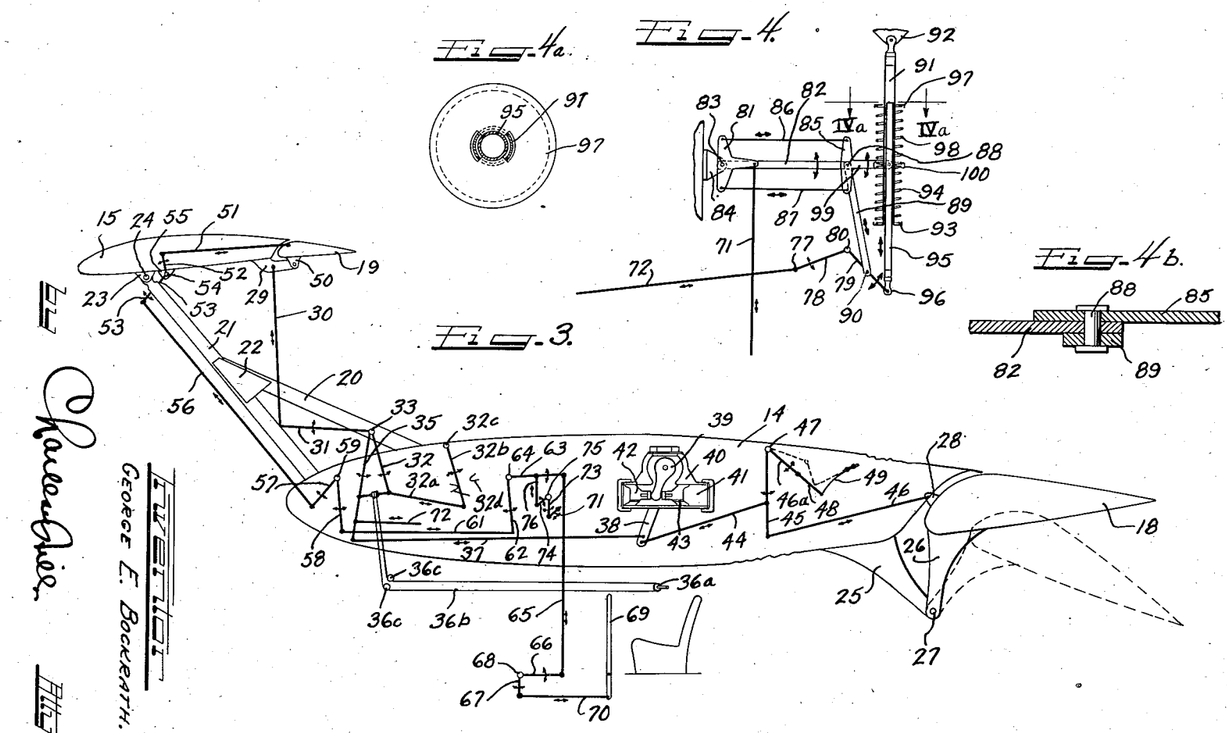
Figure 3 is a schematic view showing the aerodynamic surfaces embodying my invention and the connections therebetween.
Figure 4 is a schematic view showing the spring load for the automatic pitch control mechanism.
Figure 4a is a cross-sectional view taken on the line IVa—IVa of Figure 4.
Figure 4b is a fragmentary cross-sectional view of a portion of the mechanism shown in Figure 4.

The spring mechanism together with its cooperating differential assembly is best shown in Figure 4. This spring-differential assembly is connected to the mechanism heretofore described through links 71 and 72. The link 71 has its upper end connected with the assembly of Figure 4 while the remote end thereof, as best seen in Figures 3 and 5, is pivotally secured to a bell crank having arms 73 and 74, this bell crank being pivoted as at 75. A push-pull link 76 connects the remote end of the bell crank arm 74 with the bell crank arm 63 which has been previously described. In this manner the control stick 69 together with the surface 19 is governed by the mechanism shown in Figure 3.

The pitch control surface 15 is connected with the spring-differential mechanism by means of the push-pull link 72 (see Figure 3) which has one end connected to the bell crank arm 35 and its remote end pivotally connected as at 77 (see Figure 4) with an arm 78 having a companion arm 79, the junction of the latter arms being pivoted as at 80 to provide a bell crank.

From the foregoing it will be seen that simultaneous movements of the airfoil 15 and the airfoil 18 which are connected together as previous described will be subjected to the spring-differential mechanism through the link 72 and bell crank 78—79 while the linkages constituting the control between the control stick 69 and the push-pull rod 51, which independently operate the control foil 19 are connected likewise with the spring-differential mechanism through the push-pull link 71 by means of the connection between the bell crank arm 63 and the push-pull link 76 as previously described.

The spring-differential mechanism shown in Figure 4 is constructed and arranged in the following manner. The bell crank 81 and the link 82 are each pivoted as at 83 to a bracket 84 which is mounted to the aircraft structure in any suitable manner (see Figures 4c and 5). A companion bell crank 85 is operatively connected with the bell crank 81 by means of push-pull links 86 and 87, the bell crank 85 being pivotally connected to the remote end of the link 82 as at 88 (see Figure 4b). A link 89 is pivotally connected to the end of the member 82 at 88 and has its remote end pivotally connected with the center point of bell crank arm 79 as at 90.

The spring mechanism includes a pair of telescoping elements, the outer element being indicated at 91 and having one end pivotally secured to a bracket 92 mounted on a suitable web of the aircraft construction as shown in Figure 5. The member 91 is hollow and is provided at its remote end with a flange 93 in which is seated a coil spring 94. The inner member of the telescoping mechanism is shown at 95 and has its lower end pivotally secured to the end of the bell crank arm 79 as at 96. The member 95 is adapted to extend into the interior of the member 91 and is provided at its outer end with a flange 97 adapted to receive the end of a coil spring 98 which is opposed to the spring 94. From Figure 4a it will be seen that the external member 91 is suitably broken away so that the integral connection between the flange 97 and the member 95 is accommodated.

The bell crank 85 is provided with a bifurcated arm 99, the bifurcated end of which is relatively movably secured to a ring 100 which is, in turn, disposed between the adjacent ends of the coil springs 94 and 98 whereby rotation of the arm 99 about the pivot 88 causes the ring 100 to be actuated against either the spring 98 or the spring 94 depending upon the direction of rotation of the arm 99 as brought about in a manner to be described presently. As will be seen from Figure 5, the spring assembly may be encased in a flexible tube 100a if desired, this tube having its ends seated in flanges 93 and 97 respectively.

From the foregoing, it will be seen that movement of the control stick 69, and thus the airfoil 19, will be transmitted to the spring-differential mechanism through bell crank 81, causing rotation thereof about pivot 83, whereby such movement will be controlled by the spring and the differential due to opposed movement of members 86 and 87 and the resulting rotation of arm 99 about pivot 88. Likewise, movement of the linkages between the surface 15 and 18 will also be transmitted to the spring-differential mechanism (through the link 72, bell crank 78—79, link 89 and bell crank 85, the arm 99 thereof having translational movement imparted thereto by movement about pivot 83) whereby movements of these airfoils will also be controlled by the spring 94—98. The movement of each of the linkage systems acts as a counter balance on the spring to counteract against the movement of the other. It will also be understood that conditions may require the actuation of the airfoil 19 or the airfoils 15 and 18 independently of one another. Therefore, each set of linkages being connected to the spring, the differential will permit such independent movement depending upon flying conditions and the will of the pilot.

Assuming first that the pilot manipulates the elevator 19 by means of the control stick 69, this manipulation is spring controlled by the spring 94—98 in the following manner:

Operation of the control stick 69 causes the bell crank arm 63 to rock whereupon the push-pull rod 76 and the bell crank having arms 73 and 74, together with the push-pull rod 71 will cause the bell crank 81 to rock about the pivot 83. This rocking motion is transmitted in push-pull action to the push-pull rods 86 and 87, whereupon the bell crank 85 is rocked about the pivot 88, thereby causing rocking motion or rotation of the arm 99 and longitudinal motion of the member 100 relative to the telescoping rods 91—95. This movement of the member 100 is of course retarded to a degree by the spring 94—98. Thus it will be seen that the system between the control stick 69 and the airfoil 19 is spring loaded.

Referring now to the simultaneous moement of airfoil 15 about pivot 24 and airfoil 18 about pivot 27, it will be seen that when the pilot operates the airfoil 19 by means of the control stick 69, not only will this control movement load the spring as described above through movement imparted to the arm 99 of the bell crank 85, but also the movement of the airfoil 19, for instance downwardly, will produce an added lift on the surface 15. Ordinarily, this would be expected to produce a counterclockwise moment in the surface 15 about the pivot 24. However, movement of the control surface 19 has, as previously explained, caused the bell crank 85 to add a load to the spring. This spring load may be regarded as a counterbalancing load and together with the dynamic pressures involved produces a trim moment throughout the entire range of deflection of the surface 19 by the pilot.

Reflection of the airfoils 15 and 18 also impresses a load from the airfoil 15 upon the spring system 94—98 in the following manner: Movement of the linkage system between push-pull rod 30 which is secured to the airfoil 15, and push-pull rod 46 which is secured to the airfoil 18, causes push-pull movement of link 72 which in turn rocks the bell crank 78—79 about the pivot 80. This rocking of the latter bell crank affects both the differential system and the spring since movement of the arm 79 of the bell crank causes a given telescoping movement of the member 95 within the member 91 and one-half that amount of movement to the link 89 since the latter is secured to the middle of the bell crank arm 79.

From Figure 4 it will be seen that movement of the lower end of the rod 95 will impart a given like movement to the spring seat 97 thus effecting the tensioning or compression of spring 98 as dictated by the previously described movement of the arm 99 of bell crank 85. Likewise, rocking of the arm 79 will cause one-half this amount of movement in the link 89 which will cause bodily movement of the bell crank 85 and this translational movement of the arm 99 about the center 83 as distinguished from the rotation thereof about center 88. It will be readily understood that these latter movements of the differential-spring system cause a rocking of the bell crank 85 and the link 82 about the pivot 83 without turning the bell crank 81. Thus the movement of the airfoil 15 about the pivot 24 does not move or put loads on the control stick 69. These movements are, however, manifested in the spring-differential system and are thus delimited by the counterbalancing effect which has been imparted thereto previously by movement of the push-pull rod 71 due to movements of the control stick and the airfoil 19.

Thus it will be seen that there are provided herein two independent systems of control. First, the usual elevator control by means of the airfoil 19 which is motivated by movements of the control stick 69, these movements being transmitted to the spring-differential system to create a predetermined control or load condition therein. Second, the automatic simultaneous movements of pitch control surfaces 15 and the high lift surfaces 18 in response to changes in the dynamic pressure of the air, this simultaneous movement also being transmitted through linkage which is likewise connected to the spring-differential system and further being connected in such a manner that the control stick in the hands of the pilot is in no way affected thereby, leaving the pilot in complete control of the airfoil 19 at all times. Under such circumstances, it will be seen that complete range of movement of the elevator 19 is under the control of the pilot throughout the full range of pitch control movement of the surface 15 to which it is attached.

Referring again to the differential mechanism shown in Figure 4, it will be now understood that this mechanism is constructed and arranged for two independent movements, both of which produce a counteracting degree of pressure upon the spring system. First, in response to operation of the control stick 69 and the foil 19, the bell cranks 81 and 85 are rocked about the pivot points 83 and 88 respectively to provide rotation of the arm 99 about the pivot point 88. Second, in response to automatic movement of the pitch control surface 15 and the high lift surfaces 18, the pivot point 88 itself is moved in response to movements of the link 89 which is motivated by the rocking of the bell crank 78—79, thus giving translational movement to the arm 99. This, of course, adds a further counteracting movement to the member 100 which is secured at the end of arm 99 of bell crank 85. In addition to the above factors, the spring seat 97 itself is moved in response to movements of the pitch control surface 15 and the high lift surfaces 18 by means of the movement of rod 95 within the telescoping member 91. Spring seat 97 moves twice as much as the member 100, thereby producing no load on the arm 99.

When the control stick 69 is moved in a clockwise direction as shown in Figure 3, it imparts an upward movement to the link 71 as shown in Figure 4, this resulting in a rocking of the bell cranks 81 and 85 simultaneously in an anticlockwise direction and an upward movement of the arm 99 of bell crank 85 against the spring 98 and about the pivot point 88. This results in a compression of spring 98 against its seat 97. This tends to raise the rod 95 and add a load on the bell crank 78—79, tending to move the pivot point 96 upwardly as shown in Figure 4. The reaction of the load on the member 100 puts a downwardly directed load on the link 89 as shown in Figure 4. The counterbalancing effect of this dual load on the arm 79 of the bell crank 78—79 creates a moment about the pivot 80 which is counterclockwise thus causing a downward counterbalancing load on the aft portion of airfoil 15 in response to the added lift, which produces a counterclockwise moment about pivot 24, impressed upon the airfoil 15 by downward movement of the control foil 19. These moments are not always exactly equal, but in such cases automatic simultaneous motion of airfoils 15 and 18 will produce equality of these moments.

In view of the foregoing, it will be seen that the ultimate control of aircraft embodying the invention disclosed herein, particularly as to elevation, is at all times completely under the influence of the pilot through operation of the control stick 69 and movement of the elevator 19 and further that, in response to the action of springs 94 and 98 as conditioned by operation of the linkage between the control stick 69 and the airfoil 19, and in response to changes in aerodynamic pressure impressed upon the control surfaces, those surfaces 15 and 18 move simultaneously and automatically to respond to unbalanced moments as explained above developed by operation of the control airfoil 19.

With regard to the relative positions between the airfoil 15 and the main lift surface 14 as clearly disclosed in Figure 3, it will be seen that there is provided, in effect, a slotted wing construction. As is well known to those skilled in the art, the slot heretofore provided at the leading edge of an airfoil greatly enhances the flow over that airfoil at high angles of attack and furthermore enhances the development of increased lift upon increase in the angle of attack of the airfoil.

In the present construction, as previously set forth, the slot arrangement is provided and is adjustable, not manually as heretofore, but automatically by means of the automatic movement developed in the airfoil 15 in response to varying aerodynamic pressure exerted thereon as heretofore described.

As stated previously, the rudder and aileron control assembly to be associated with the above discussed trim control assembly may be of any conventional form. However, in Figure 7 there is disclosed a preferred form wherein a single control is provided for the ailerons and rudders. In this figure the details of the control for the automatically operated flaps 18 and the elevator 19 are omitted for purposes of clarity. The rudders 16 and aileron 17 are operated together by a control wire assembly which is controlled by means of hand wheel 101 which is secured to the upper end of control stick 69 which in turn connects with link 70, bell crank 66—67 and push-pull rod 65 as previously explained.

The control wires for the ailerons and rudders are indicated generally at 102 and constitute crossed links 103 which terminate at their outer ends in a double wire arrangement 104—105 whereby the links 103, due to rotation of the hand wheel 101, impart movement to the respective rudders and ailerons. In the particular arrangement shown the wire links 104 terminate at the upper end of standards 104a extending above the aileron 17 while the sections 105 terminate at the outer ends of horizontal standards 105a which extend through the respective rudders 16. From Figure 7 it will be seen that the lower ends of standards 104a on the respective ailerons are connected through control wire 106 while the inner ends of the members 105a through the rudders are connected by the control wire 107. Thus there is provided, in effect, a single control for both the ailerons and the rudders, this control being manipulated by the pilot through turning of the hand wheel 101. With the arrangement shown and described above, a given manipulation of the control wheel 101 will cause a deflection of both of the rudders in the given, same direction while the respective ailerons 17 will be deflected through reverse angles to provide the desired banking.

From the foregoing it will be seen that a single control has been provided for both ailerons and rudders and that there is associated with this single control the stick 69 which the pilot may manipulate the elevator 19 through a rocking motion of the control stick as previously described. There is, in effect, provided a dual control for handling the ailerons, the rudders and the elevator.

It has been found that aircraft having the automatic pitch control previously described is well adapted for further control by air brakes or the like since the pitch control system is in a large measure governed by the dynamic pressure of the air impinged thereagainst. It will be readily understood that any air brake actuating mechanism may be utilized and that such assembly may be disposed at any of the conventional locations in the aircraft consistent with the aerodynamic design of the particular aircraft in question. It will also be understood that while the air brake construction is shown in Figure 8 that I contemplate the association of this mechanism in the aircraft in any conventional manner as described above.

Figures 7, 8:
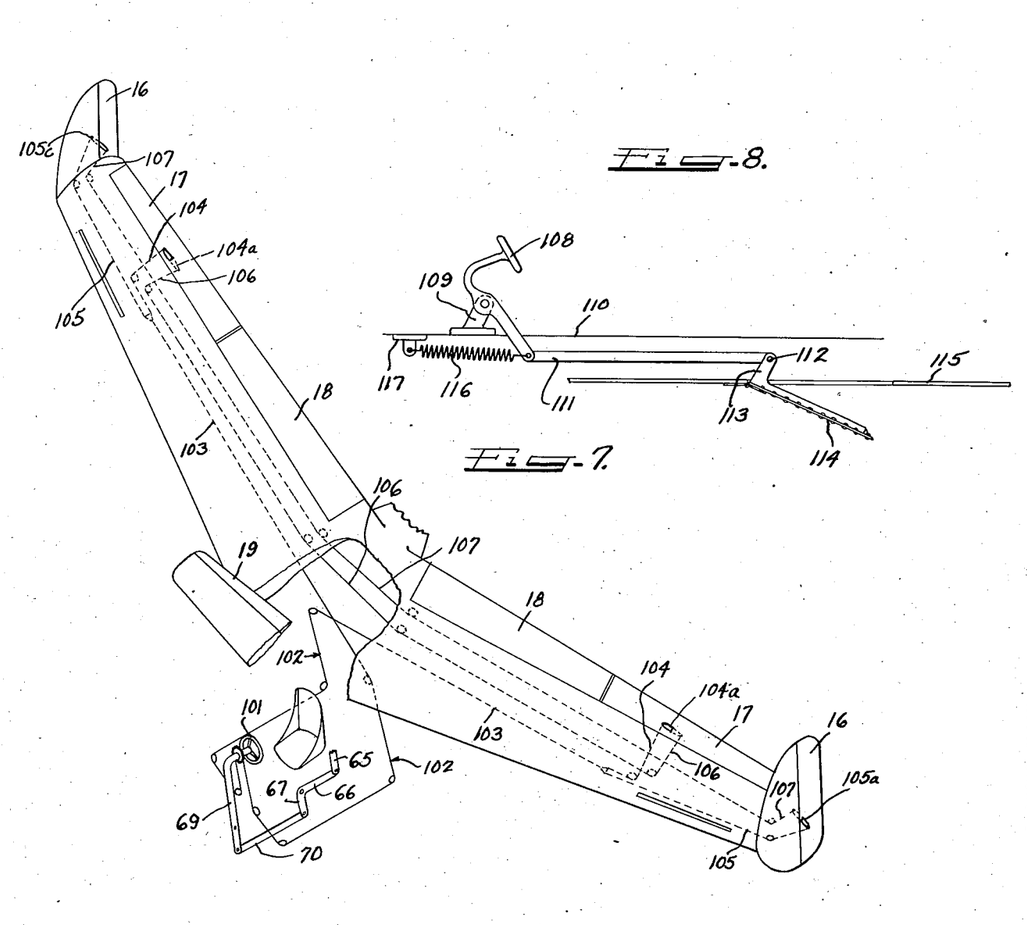
Figure 7 is a fragmentary schematic view of a two-control system embodying my invention.
Figure 8 is a cross-sectional view of an airbrake construction adapted for combination with other features of my invention.

As shown in Figure 8 the air brake preferably includes an operating foot pedal 108 pivotally secured to a standard 109 mounted on any suitable web or partition 110 of the aircraft. The end of the control pedal remote from the foot piece is pivoted to a push-pull member 111, the other end of which is pivoted as at 112 to an arm 113 on an air brake member 114 which operates toward and away from a portion of the aircraft 115. To the end that the air brake 114 together with the manipulating pedal 108 may be retracted to positions wherein the air brake is in alignment with the associated member 115 there is provided a tension spring 116 which has one end secured to the end of the manipulating pedal which is pivoted to the push-pull rod 111 and has its other end secured in any suitable manner to the partition or web 110 as by a bracket 117.

As previously stated, one of the objects of my invention is to provide an aircraft control assembly which greatly enhances the controllability of the craft to permit the pilot to maintain very low rates of speed without using the elevator control to balance the diving moments which are developed in conventional aircraft. Thus the incorporation of an air brake assembly greatly aids in controlling the speed of the aircraft without the immediate need of adjusting engine power output.

What I claim is:

1. In an aircraft control assembly, a main lift surface, a high lift flap operatively associated therewith, a pitch control surface disposed forward of the center of gravity of the aircraft, said pitch control surface having means for hingedly mounting it to the airplane at substantially its aerodynamic center and including elevator means disposed aft and spanwise thereof, a control member at the pilot station of the aircraft, means for operatively connecting said elevator means with said control member, and means for connecting said pitch control surface and said high lift flap whereby said pitch control surface and said high lift flap move simultaneously through various angles of attack automatically in response to variations in the dynamic pressure impressed thereon during flight.

2. In an aircraft control assembly, a main lift surface having high lift means operatively disposed on a horizontal pivot axis aft thereof, pitch control means operatively disposed forwardly thereof and mounted to pivot about substantially its mean aerodynamic center, and means connecting said pitch control means and said high lift means for effecting simultaneous movement thereof, said pitch control means and said high lift means being movable automatically for pitch control under the influence of varying dynamic pressure impressed thereupon during flight.

3. In an aircraft control assembly, a main lift surface having high lift means operatively disposed aft thereof, pitch control means operatively disposed forwardly thereof and mounted hingedly at substantially its mean aerodynamic center for movement under the influence of varying dynamic pressure impressed thereon during flight, means connecting said pitch control means and said high lift means for affording simultaneous movement thereof, and spring means for urging said pitch control means through trimming movements to correct for pitching produced by said high lift means and said main lift means.

4. In an aircraft trim control assembly, a main lift surface having high lift means operatively disposed aft thereof, pitch control means operatively disposed forwardly thereof and hingedly mounted at substantially its aerodynamic center, and means connecting said pitch control means and said high lift means to afford simultaneous automatic movement thereof under the influence of varying dynamic pressure impressed thereupon during flight.

5. In an aircraft trim control assembly having main lift means, high lift members and a pitch control surface operably connected to said high lift members for simultaneous movement, said pitch control surface being constructed and arranged to be hingedly mounted at substantially its aerodynamic center and to be automatically deflected by variations in the dynamic pressure impressed thereupon during flight to compensate for pitching moment set up by said high lift members and said main lift means.

6. In an aircraft control assembly, a main lift surface, pitch control means hingedly secured forward and above said surface at substantially the aerodynamic center of said means, high lift means hingedly secured at the aft edge of said main lift surface and operably connected for movement with said pitch control means, said pitch control means being constructed and arranged to assume varying angles of attack automatically under the influence of dynamic pressures impressed thereon to bring about trimming moments in the aircraft to compensate for pitching moment set up therein by said high lift means and by said main lift means.

7. In combination in an aircraft, a main lift surface, high lift means, trim control means comprising an aerodynamic member pivotally mounted at substantially the aerodynamic center thereof and automatically responsive to the speed of the relative wind during flight to trim the aircraft, means for operatively connecting said trim control means and said high lift means for coordinated action, and dampening means operatively associated with said connecting means to prevent fluttering of said high lift means and said pitch control means.

8. In an aircraft control assembly, a main lift device, a pitch control assembly including a control surface mounted to pivot about substantially the aerodynamic center thereof automatically in response to aerodynamic pressure imposed thereon during flight, spring means for automatically urging said pitch control assembly through pitch control movement in accordance with certain variations in dynamic pressure imposed upon the pitch control assembly and means operatively associated with said pitch control assembly for damping the oscillation thereof to reduce fluttering during the pitch control movement thereof.

9. In an aircraft control assembly, a main lift surface, high lift means, a pitch control surface pivotally mounted at substantially the mean aerodynamic center thereof and thereby being automatically operative in response to dynamic pressure during flight, and means for connecting said high lift means and pitch control surface to afford simultaneous movement thereof, and means associated with said connecting means for adjustably varying the angles of attack of said high lift means and said pitch control surface relative to one another.

10. In an aircraft control assembly, a main lift surface, high lift means, a pitch control surface pivotally mounted at substantially the mean aerodynamic center thereof and thereby being automatically operative in response to dynamic pressure during flight, means for connecting said high lift means and pitch control surface to afford simultaneous movement thereof, and means associated with said connecting means for adjustably varying the angles of attack of said high lift means and said pitch control surface relative to one another, said connecting means including a rocking arm operatively connected with said high lift means and a second rocking arm operatively associated with said pitch control surface, said arms being mounted at a common pivotal point and having an expansible rigid member disposed therebetween to afford simultaneous rocking movement of said arms and means for expanding and contracting said rigid member at the will of the operator to vary the angle between the arms thereby to vary the relative angle between the high lift means and said pitch control surface.

11. In an aircraft control assembly, a main lift surface having high lift means operatively disposed aft thereof, pitch control means operatively disposed forwardly thereof comprising an aerodynamic member pivotally mounted for movement about substantially the aerodynamic center thereof whereby to respond automatically to the speed of the relative wind during flight for trimming the aircraft with which the control assembly is associated, means connecting said pitch control means and said high lift means for simultaneous movement thereof automatically under the influence of varying dynamic pressure impressed upon said pitch control means and said high lift means during flight, an elevator member disposed spanwise and aft on said pitch control means, and means for connecting said elevator to a control element at the pilot's station to afford manual variation in the angle of attack of said elevator throughout the range of pitch control movement of said pitch control means.

12. The combination of a pitch control surface in an aircraft assembly of an elevator member hingedly mounted on said pitch control surface for angular movement relative thereto, said pitch control surface being mounted to swing automatically about substantially its mean aerodynamic center through varying angles of attack in response to the dynamic pressure imposed thereon during flight, and means connecting said elevator member to a control element at the pilot's station to afford manual adjustment of the angle of attack of said elevator member throughout the range of variation of the angle of attack of said control surface and compatible with the dynamic pressure responsiveness of the latter.

13. In an aircraft assembly, high lift means and pitch control means hingedly mounted for automatic variation in the angle of attack thereof in accordance with the dynamic pressure imposed thereon during flight, a first motion transmitting assembly connecting said high lift means and said pitch control means to afford simultaneous movement thereof, an elevator surface hingedly secured to said pitch control means, a control member at the pilot's station, a second motion transmitting assembly between said control member and said elevator surface, a spring assembly operatively connected with said motion transmitting assemblies, means for connecting said first motion transmitting assembly with said spring assembly to vary the resisting force thereof in accordance with the movements of said pitch control means, means for connecting said first motion transmitting assembly with said spring assembly to control the movements of said first motion transmitting assembly responsive to control movements of said pitch control means, a differential mechanism interposed between said spring assembly and said first motion transmitting assembly, and means connecting said differential assembly with said second motion transmitting assembly thereby to afford a counterbalancing reaction on the spring assembly through said differential assembly upon movement of said elevator surface by said control member.

14. In an aircraft assembly, main lift means, high lift means hingedly mounted aft thereof, a hingedly mounted pitch control surface, and an elevator hingedly mounted aft thereof, a control member at the pilot's station, a first motion transmitting mechanism between said high lift means and said pitch control surface, a second motion transmitting mechanism between said elevator and said pilot control member, a spring assembly constructed and arranged to constrain movement of said first motion transmitting mechanism, a differential assembly having an arm constructed and arranged for translational and rotational movement, said arm engaging said spring assembly to be moved thereby through translational movement and being adapted upon rotation to vary the tension of the spring, means connecting the first motion transmitting mechanism to said differential assembly to impart translational movement thereto, means connecting said second motion transmitting mechanism with said differential assembly to impart rotational movement to said arm and means connecting said first motion transmitting mechanism to said spring assembly to impart a load upon the spring assembly during movement of said high lift means and said pitch control surface.

15. In an aircraft assembly having a high lift surface and a pitch control surface, an elevator hingedly mounted on said pitch control surface, a control member at the pilot's station, a first motion transmitting means operatively connected between said control surface and said high lift surface, a second motion transmitting mechanism operatively connected between said elevator and said control member; a counterbalancing constraining assembly including a differential mechanism having a pair of bell cranks constructed and arranged to pivot simultaneously, an arm pivoted coincidentally with one of said bell cranks and constructed and arranged to pivotally carry the other bell crank at the remote end thereof, said last named bell crank having an extension adapted for rotational movement upon simultaneous rotation of said bell cranks about their pivot points and for translational movement upon rotation of said arm about its pivot point, a constraining spring assembly connected with the remote end of said extension, said assembly including a spring mounted on a pair of telescoping members each having a flange bearing against one end of said spring, means for connecting one of said bell cranks with said second motion transmitting mechanism whereby movement of said mechanism affords simultaneous rotation of said bell cranks, means connecting said arm with the first of said motion transmitting mechanisms whereby movement of said mechanism causes rotation of said arm about its pivot point and translation of said extension, and means connecting one end of said telescoping members to said first motion transmitting mechanism whereby a load is impressed upon the spring during movement of said motion transmitting mechanism between the high lift surface and the pitch control surface.

16. In an aircraft assembly having hingedly mounted control surfaces and motion transmitting mechanism operatively connected therebetween to afford simultaneous movement of said surfaces, a constraining spring assembly associated with said motion transmitting mechanism to be loaded thereby and to constrain the movements thereof, said assembly including a spring, an expansible and contractible mounting for said spring, means for connecting said motion transmitting mechanism with said spring thereby to afford constraint in the movement of said motion transmitting mechanism, and means connecting said motion transmitting mechanism to said expansible and contractible mounting thereby to impress a load upon said spring upon movement of said mechanism.

17. In an aircraft assembly, a pair of control surfaces movably mounted to be subject to dynamic pressure in flight to move them automatically within certain limits from a normal relatively high angle of attack to a decreased angle of attack proportionate to the speed of the aircraft, one of said control surfaces being mounted to move about substantially its aerodynamic center, motion transmitting means operatively connecting said surfaces to afford simultaneous variations in the angle of attack thereof, means associated with said motion transmitting mechanism to dampen the movements of said surfaces, means for constraining the variation of the angle of attack of said surfaces upon variation in the dynamic pressure impressed thereupon during flight, and means associated with said transmitting mechanism for impressing increased resistance upon the movement of said surfaces as they move toward decreasing angles of attack.

18. In a differential assembly for aircraft having lift surfaces, an elevator and a pilot control for said elevator, said differential assembly being adapted to counter-balance independent motion transmitting mechanisms connected with lift surfaces of the aircraft, a first bell crank pivoted to a stable member of the aircraft, a first motion transmitting mechanism operatively connected with a lift surface of the aircraft, means for connecting said bell crank with said first motion transmitting mechanism, an elongated arm pivoted coincident with said bell crank, a second bell crank pivotally mounted at the end of said arm remote from said first bell crank and including an extension, a constraining mechanism adapted to be engaged by said extension, means for connecting said bell cranks to afford simultaneous pivotal movement thereof and rotational movement of said extension therewith, and means connecting said remote end of said arm with a second motion transmitting mechanism to afford rotation of said arm about said stable member of the aircraft thereby to impart transitional movement to said second bell crank and to the extension thereon.

19. In combination in an aircraft assembly, a main lift surface, high lift means hingedly secured aft on said main lift surface, a pitch control surface disposed above said main lift surface and forwardly of the center of gravity of the aircraft assembly, said pitch control surface being mounted to swing substantially about its aerodynamic center for automatic response to the speed of the relative wind during flight to trim the aircraft, and a connecting assembly between said high lift means and said pitch control surface to afford simultaneous movement thereof automatically in response to varying dynamic pressures impressed upon the latter during flight.

20. In combination in air aircraft of the character described, a main lift surface, and pitch control airfoil means comprising a surface mounted to pivot about substantially its mean aerodynamic center, means normally constraining said pitch control airfoil means at a relatively high angle of attack to overcome diving moments in the lowest airborne speed of the aircraft, said pitch control airfoil means being automatically responsive to increases in dynamic pressure at increased speeds of the aircraft to adjust to proportionately decreased angles of attack, whereby to maintain the aircraft at all times automatically in trim independently of the pilot of the aircraft.

21. In combination in an aircraft of the character described, a main lift surface, pitch control means comprising a surface mounted to pivot about substantially its mean aerodynamic center, means normally constraining said pitch control means to operate at a relatively high angle of attack to overcome diving moments at the lowest airborne speed of the aircraft, said pitch control means being automatically responsive to increases in dynamic pressure at increased speeds of the aircraft to adjust to proportionately decreased angles of attack, whereby to maintain the aircraft at all times automatically in trim independently of the pilot of the aircraft, and pilot controlled elevator means cooperatively related to the pitch control means for varying the elevation of the aircraft in flight and adapted to function compatibly with the automatic operation of the pitch control means.

22. In combination in an aircraft of the character described, a main lift surface, pitch control means comprising pivoted trim elements forwardly and aft of the main lift surface connected for automatic cooperative movement and constrained at the lowest airborne speed of the aircraft at a relatively high angle of attack to overcome diving moments thereof, one of said pivoted trim elements being mounted to pivot about substantially its mean aerodynamic center, said pitch control means being automatically responsive to increases in dynamic pressure at increased speeds of the aircraft to adjust to proportionately decreased angles of attack and thereby maintain the aircraft at all times automatically in trim independent of pilot attention, pilot controlled elevator flap structure cooperatively related to the pitch control means for varying the elevation of the aircraft in flight and functioning compatibly with the automatic operation of the pitch control means, and means for imposing a counterbalancing load on said pitch control means acting in conjunction with the dynamic pressure involved in the operation of the pitch control means to produce a trim moment throughout the entire range of deflection of the elevator means by the pilot.

GEORGE E. BOCKRATH.

REFERENCES CITED

The following references are of record in the file of this patent:

UNITED STATES PATENTS

| Number | Name | Date |
|---|---|---|
| 2,254,473 | De Bell | Sept. 2, 1941 |
| 1,124,584 | Barrows | Jan. 12, 1915 |
| 1,083,464 | Roche | Jan. 6, 1914 |

(Other references on following page)

UNITED STATES PATENTS

| Number | Name | Date |
|---|---|---|
| 2,092,424 | Potez | Sept. 7, 1937 |
| 1,492,006 | Tarbox | Apr. 29, 1924 |
| 1,935,824 | Upson | Nov. 21, 1933 |
| 2,082,172 | Mignet | June 1, 1937 |
| 2,112,755 | Back | Mar. 29, 1938 |
| 2,198,893 | Van Wavern | Apr. 30, 1940 |
| 2,164,531 | Lee | July 4, 1939 |
| 2,065,684 | Gaines | Dec. 29, 1936 |
| 2,110,516 | Weick | Mar. 8, 1938 |
| 1,729,210 | Delage | Sept. 24, 1929 |
| 1,783,348 | Taylor | Dec. 2, 1930 |
| 1,892,927 | Blaylock | Jan. 3, 1933 |
| 2,112,757 | Billioque | Mar. 29, 1938 |
| 2,104,006 | Ballou | Jan. 4, 1938 |
| 2,271,226 | Johnson | Jan. 27, 1942 |
| 2,156,994 | Lachmann | May 2, 1939 |

FOREIGN PATENTS

| Number | Country | Date |
|---|---|---|
| 12,195 | Great Britain | 1910 |
| 803,976 | France | Aug. 10, 1937 |